(12) United States Patent
Faryar et al.

(10) Patent No.: US 6,680,974 B1
(45) Date of Patent: Jan. 20, 2004

(54) METHODS AND APPARATUS FOR CONTEXT SELECTION OF BLOCK TRANSFORM COEFFICIENTS

(75) Inventors: Alireza Farid Faryar, Fair Haven, NJ (US); Moushumi Sen, West End, NJ (US); Kyeong Ho Yang, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/452,990

(22) Filed: Dec. 2, 1999

(51) Int. Cl.$^7$ ................................................ H04B 1/66
(52) U.S. Cl. ................................................ 375/240.18
(58) Field of Search ................................. 348/392, 408, 348/424, 401, 238; 375/240, 240.01, 240.02, 240.04, 240.23; 382/248, 239, 250, 261

(56) References Cited

U.S. PATENT DOCUMENTS

| | | | | |
|---|---|---|---|---|
| 5,644,361 A | * | 7/1997 | Ran et al. | 375/240.01 |
| 5,914,680 A | * | 6/1999 | Murashita | 341/107 |
| 6,118,903 A | * | 9/2000 | Liu | 382/245 |
| 6,219,457 B1 | * | 4/2001 | Potu | 382/246 |
| 6,222,881 B1 | * | 4/2001 | Walker | 375/240.03 |
| 6,249,609 B1 | * | 6/2001 | Sunakawa et al. | 382/232 |
| 6,272,180 B1 | * | 8/2001 | Lei | 375/240.16 |

FOREIGN PATENT DOCUMENTS

| | | |
|---|---|---|
| CA | 2248021 | 9/1997 |
| CA | 2252081 | 4/1999 |
| CA | 2310341 | 12/2000 |

* cited by examiner

Primary Examiner—Chris Kelley
Assistant Examiner—Behrooz Senfi

(57) ABSTRACT

A technique for use in a block transform-based coding system of processing (e.g., encoding and/or decoding) one or more block transform coefficients associated with at least one block of visual data (e.g., an image and/or video sequence) comprises the following steps. First, one or more previously reconstructed block transform coefficients associated with the visual data are identified. Then, a context selection value is computed for use in processing a block transform coefficient associated with the at least one block, the context selection value being based on the one or more previously reconstructed block transform coefficients. The context selection value may be computed as a function of one or more values respectively associated with one or more previously reconstructed block transform coefficients in near proximity, with respect to a scanning order, to the block transform coefficient to be processed. Further, the context selection value may be computed as a function of a spatial frequency associated with the block transform coefficient. Still further, the context selection value may be computed as a function of both the one or more values respectively associated with the one or more previously reconstructed block transform coefficients in near scanning order proximity and the spatial frequency associated with the block transform coefficient.

28 Claims, 3 Drawing Sheets

METHODS AND APPARATUS FOR CONTEXT SELECTION OF BLOCK TRANSFORM COEFFICIENTS

This invention was made with U.S. Government support under NIST cooperative agreement no. 70NANB7H3051 (proposal no.97-04-0020) entitled: "Enabling Technology for a Digital Video Optical Tape Recorder of High Definition Motion Imagery." The U.S. Government may have certain rights in this invention.

FIELD OF THE INVENTION

The invention relates to video and/or image compression and, more particularly, to methods and apparatus for context selection of block transform coefficients in a video and/or image compression system.

BACKGROUND OF THE INVENTION

Lossless and near-lossless image and video compression techniques have generated considerable interest in the video processing community in recent years. Examples of such known techniques have been extensively described in the image and video compression literature, for example: Draft of MPEG-2: Test Model 5, ISO/IEC JTC1/SC29/WG11, April 1993; Draft of ITU-T Recommendation H.263, ITU-T SG XV, December 1995; "Lossless and near-lossless coding of continuous tone still images" (JPEG-LS), ISO/IEC JTC1/SC 29/WG 1, July 1997; B. Haskell, A. Puri, and A. N. Netravali, "Digital video: An introduction to MPEG-2, " Chapman and Hall, 1997; H. G. Musmann, P. Pirsch, and H. J. Gralleer, "Advances in picture coding," Proc. IEEE, vol.73, no. 4, pp.523–548, April 1985; N. D. Memon and K. Sayood, "Lossless compression of video sequences," *IEEE Trans. Communications*, vol. 44, no.10, pp. 1340–1345, October 1996; A. N. Netravali and B. G. Haskell, "Digital Pictures: Representation, Compression, and Standards," 2$^{nd}$ Ed., Plenum Press, 1995; A. Said and W. A. Pearlman, "New, fast, and efficient image codec based on set partitioning in hierarchical trees," *IEEE Trans. Circuit and Systems for Video Technology*, vol. 6, no. 3, pp.243–249, June 1996; M. J. Weinberger, J. J. Rissanen, and R. B. Arps, "Applications of universal context modeling to lossless compression of gray-scale images," IEEE Trans. Image Processing, vol. 5, no. 4, pp.575–586, April 1996; X. Wu and N. Memon, "Context-based, adaptive, lossless image coding," IEEE Trans. Communications, vol. 45, no. 4, pp. 437–444, April 1997; and Z. Xiong, K. Ramchandran, and M. T. Orchard, "Space frequency quantization for wavelet image coding," IEEE Trans. Image Processing, vol. 6, 1997.

These conventional techniques have been used in an attempt to generate high quality, perceptually distortion free compressed video and still images. One of the issues of interest in developing an image or video compression technique is the reduction of overhead data that must be sent by the encoder to the decoder for proper decoding of the coded bit stream. Approaches which have attempted to take this issue into consideration can be roughly classified into two categories: context-based predictive coding in the spatial domain and context-based coding in the wavelet domain. Examples of the spatial domain techniques are discussed in "Lossless and near-lossless coding of continuous tone still images" (JPEG-LS), ISO/IEC JTC1/SC 29/WG 1, July 1997; the Weinberger et al. article; and the Wu et al. article, as mentioned above. Examples of the wavelet domain techniques are discussed in the Memon et al. article; the Said et al. article; and the Xiong et al. article, as mentioned above.

While some of the aforementioned art techniques do not require sending overhead information pertaining to coding parameters employed at an encoder to a corresponding decoder, the existing techniques for accomplishing this have exhibited a variety of shortcomings, e.g., high complexity, high cost to implement/operate, etc. Thus, it would be highly advantageous to provide an improved compression technique for block transform coding which not only avoids the burden of transmitting coding parameter related information to a decoder but also eliminates, or at least substantially minimizes, the shortcomings of existing approaches.

SUMMARY OF THE INVENTION

The present invention provides methods and apparatus for context selection of an image or video sequence in the transform domain. The transform coefficients may be obtained using a particular block transform, e.g., Hadamard transform. With proper context selection, and pre-specified selection rules, an encoder according to the invention can change the coding parameters of each block-and/or coefficient that is currently being encoded, depending solely on the context of the surrounding blocks or transform coefficients, without having to specifically send these coding parameters to a corresponding decoder.

In one aspect of the invention, a method for use in a block transform-based coding system of processing (e.g., encoding and/or decoding) one or more block transform coefficients associated with at least one block of visual data (e.g., an image and/or video sequence) comprises the following steps. First, one or more previously reconstructed block transform coefficients associated with the visual data are identified. Then, a context selection value is computed for use in processing a block transform coefficient associated with the at least one block, the context selection value being based on the one or more previously reconstructed block transform coefficients.

The context selection value may be computed as a function of one or more values respectively associated with one or more previously reconstructed block transform coefficients in near proximity, with respect to a scanning order, to the block transform coefficient to be processed. Further, the context selection value may be computed as a function of a spatial frequency associated with the block transform coefficient. In particular, previously reconstructed coefficients with the same spatial frequency (context) value may determine the coding parameters that will be used to encode the coefficient. Still further, the context selection value may be computed as a function of both the one or more values respectively associated with the one or more previously reconstructed block transform coefficients in near scanning order proximity and the spatial frequency associated with the block transform coefficient.

Since selection of block transform coefficients at an encoder is accomplished according to the invention using only previously reconstructed samples, the encoder does not need to provide such coding parameter information to the corresponding decoder since the decoder can get the information using the same previously reconstructed samples used at the encoder. Advantageously, transmission bandwidth and/or storage capacity is saved.

DETAILED DESCRIPTION OF PREFERRED EMBODIMENTS

As used herein, the term "video" or "video sequence" should be understood to include any frame or field sequence which is in a form suitable for encoding in accordance with standards such as, for example, H.261, H.263, Motion-JPEG, MPEG-1 and MPEG-2. The terms "image" or "picture" as used herein refer to a frame or field of a video sequence. The term "block" as used in accordance with the invention is intended to include not only macroblocks as defined in the above-noted compression standards, but more generally, any grouping of pixel elements in a video frame or field. It is to be appreciated that such a grouping may include a set of pixels or a single pixel. Further, the meaning of the term "sample" as used in accordance with the invention refers to a component associated with a block. For example, a transform coefficient generated in accordance with a block transform operation may be a sample. Still further, the term "context" refers to a value used to describe a current block's surroundings which, according to the invention, is derived from previously reconstructed samples. As mentioned above and as will be explained in detail, in context-based block transform coefficient selection according to the invention, the context is a value which may be measured from previously reconstructed neighboring samples. It is to be appreciated that such block transform coefficient selection is performed in both a video encoder and video decoder so that block transform coefficient selection-related data does not need to be transmitted from the encoder to the decoder.

Context-based selection of transform coefficients according to the present invention will be explained using three exemplary embodiments: (i) frequency-based context selection; (ii) nearest neighbor-based context selection; and (iii) frequency and nearest neighbor-based context selection.

It is to be appreciated that all coding parameters and decisions are made using only the context associated with each coefficient, which is dependent solely on the previously reconstructed coefficients. Advantageously, this rule guarantees that the encoder and decoder have identical information available to them at all times, and are thus always in synchronization, without the encoder specifically sending coding parameters for each block, or worse still, for each transform coefficient.

Figure 1:
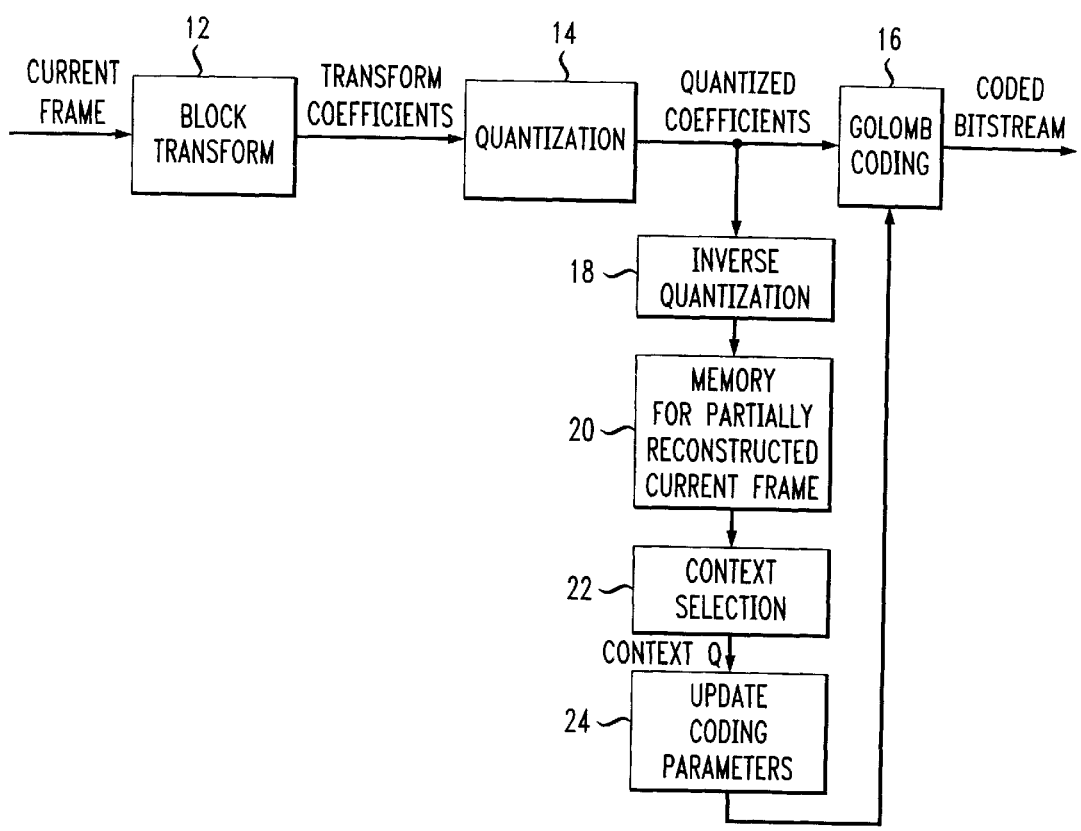
FIG. 1 is a block diagram of an image/video encoder employing context-based block transform encoding according to an exemplary embodiment of the present invention.

Referring to FIG. 1, a block diagram of an image/video encoder employing context-based block transform coding according to an exemplary embodiment of the present invention is shown. The exemplary encoder 10 includes a block transformer 12, a quantizer 14, a Golomb coder 16, an inverse quantizer 18, a memory for partially reconstructed current frame 20, a context selector 22, and coding parameter updating unit 24.

A signal representing a current frame is received at the input of the encoder 10. The signal may represent an image, e.g., a single frame, or a video sequence, e.g., multiple frames. Nonetheless, the encoder 10 encodes the signal on a transform coefficient-by-transform coefficient basis. For example, a block may contain an 8×8 pixel array. In the block transformer 12, a block is transformed yielding transform coefficients. The transform may be an 8×8 Hadamard transform, however, any other invertible block transform may be employed. A transform coefficient is then provided to quantizer 14 where the transform coefficient is quantized. The quantized coefficient of the current block is then coded in a Golomb coder 16. A conventional Golomb coder may be employed such as, for example, is described in "Lossless and near-lossless coding of continuous tone still images" (JPEG-LS), ISO/IEC JTC1/SC 29/WG 1, July 1997, the disclosure of which is incorporated herein by reference. The resulting coded bit stream is then transmitted.

In addition, the quantized coefficients are reconstructed. That is, the quantized value of the current transform coefficient is provided to the inverse quantizer 18 such that the quantization operation is reversed yielding a reconstructed transform coefficient. The reconstructed transform coefficient is stored in the memory 20.

According to the invention, one or more reconstructed coefficients are then used in the coding process of a subsequent coefficient, as will be explained below. Particularly, one or more reconstructed coefficients are used by the context selector 22 to generate a context value Q. This context value Q is then provided to the coding parameter updater 24 which generates an output that is provided to the Golomb coding unit 16. The coding parameters required during Golomb coding, A(Q) and N(Q), are updated in unit 24 in accordance with the procedure described in the above-incorporated JPEG-LS reference. These parameter values are a function of the current and previously reconstructed transform coefficients, each of which have the same context Q as the current coefficient. The updating rule for the coding parameters A(Q) and N(Q) is given below:

$$A(Q) = A(Q) + |Rx| \qquad (1)$$

if $(N(Q) == RESET)$

{

$\quad A(Q) = A(Q)/2$ $\quad N(Q) = N(Q)/2$

}

$N(Q) = N(Q) + 1$ where |Rx| denotes the absolute value of Rx, the reconstructed value of the current coefficient and RESET is a predetermined constant. We preferably use a value of RESET=64 for 8×8 block transform coefficients. Note that these updated parameter values will be used to encode the next coefficient which has the same context Q, and not the current coefficient Rx.

These updated Golomb coding parameters are then used to produce the coded bitstream for a subsequent coefficient with the same context Q. Thus, the selection procedure of the context Q for each reconstructed coefficient is important in determining how effectively each quantized transform coefficient is compressed by the Golomb coding unit 16.

It is to be appreciated that the encoder 10 may use the first reconstructed coefficient in a first block of a current frame as a context to encode the next coefficient, however, it may also wait until a certain number of coefficients have been reconstructed before using the reconstructed samples in the encoding operation of a subsequent coefficient. Also, coefficients in previously reconstructed blocks may be used to encode a coefficient in a current block.

It is to be understood that the various embodiments that will be discussed below provide various methodologies for generating the context value Q of each reconstructed transform coefficient. By employing one of these techniques, the encoder 10 utilizes context to determine the coding parameters used subsequently in the Golomb coding unit 16. Each method of context selection uses one or more properties typically exhibited by the block transform coefficients of images. In the following embodiments, for ease of explanation, we assume that the invertible block transform operates on 8×8 blocks, however, extension to any other n×n block size is trivial.

(a) Frequency-based Context Selection

This method of selecting the context for transform coefficients assumes that the value that each coefficient takes is dependent on its horizontal and vertical spatial frequencies. For example, in the case when the image/video data is subject to an M×N invertible block transform, there are M.N different possible contexts, each corresponding to one of M.N different possible spatial frequencies, where the period denotes multiplication. Thus, if $Q_F(i,j)$ denotes the context of the $(i,j)^{th}$ coefficient, then:

$$Q_F(i,j) = N \cdot i + j, \text{ where } i=0,1,\ldots,M-1 \text{ and } j=0,1,\ldots,N-1 \quad (2)$$

The coding parameters $A(Q_F)$ and $N(Q_F)$, calculated from previously reconstructed transform coefficients which have the same context $Q_F$, are then used to Golomb code the current reconstructed coefficient Rx. Subsequently, Rx is used to update the aforementioned parameters $A(Q_F)$ and $N(Q_F)$ in the coding parameter updating unit 24.

(b) Nearest Neighbor-based Context Selection

Figure 2:
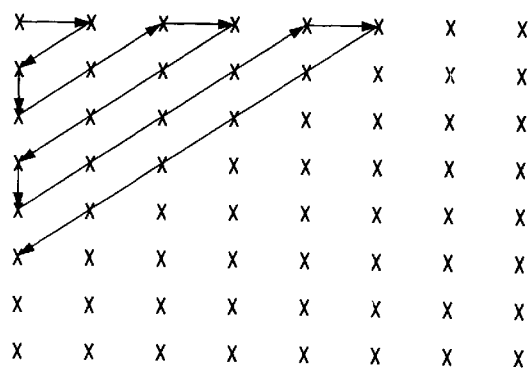
FIG. 2 is a diagram illustrating a zigzig scanning order used for transform coefficients of an 8×8 data block.

This method of determining the context for each transform coefficient assumes that the value of each coefficient is dependent on the neighboring coefficients which have been previously coded and reconstructed in the transform domain. The order in which the coefficients in each block are scanned and coded is preferably the standard zigzag scan mode used commonly in block transform coding. This scan mode is illustrated in FIG. 2.

According to the invention, the context selector 22 (FIG. 1) chooses three neighboring coefficients, a, b and c, for each transform coefficient x. If (i,j) corresponds to the position of the current coefficient x, then the positions of its nearest neighbors a, b and c can be determined according to one of the following formulas:

$$a=(i+1,j-1), b=(i,j-1) \text{ and } c=(i-1,j) \text{ during an upward scan}, \quad (3)$$

or $$a=(i-1,j+1), b=(i-1,j) \text{ and } c=(i,j-1) \text{ during an upward scan}, \quad (4)$$

Figure 3:
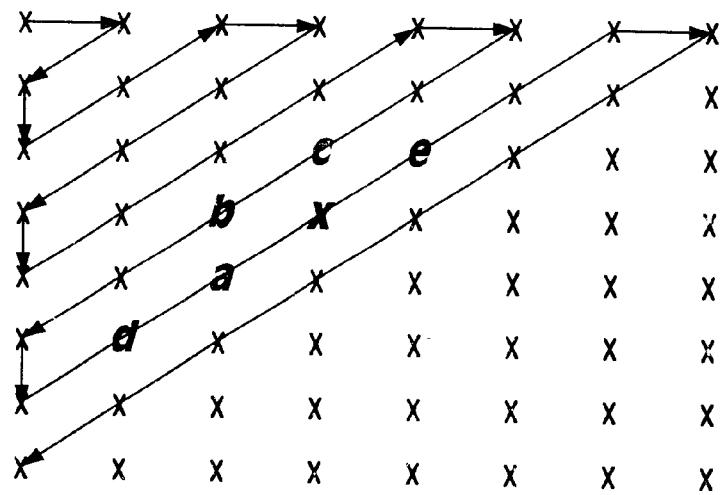
FIG. 3 is a diagram illustrating the nearest neighbors a, b & c of the transform coefficient x during an upward swing of a zigzig scanning order on transform coefficients according to an exemplary embodiment of the present invention.
Figure 4:
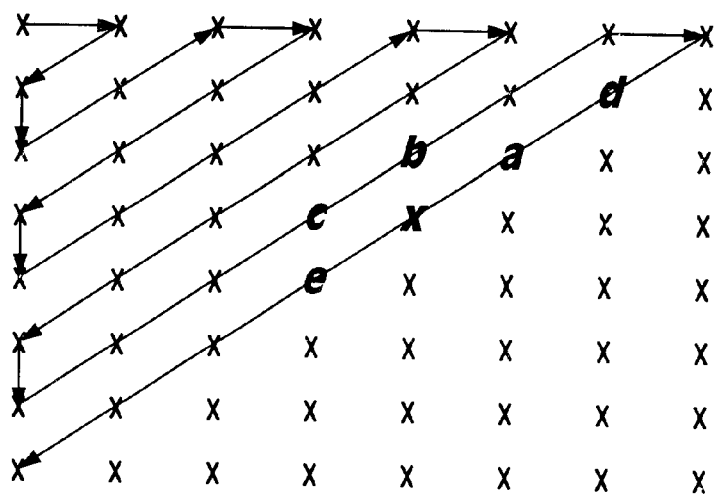
FIG. 4 is a diagram illustrating the nearest neighbors a, b & c of the transform coefficient x during a downward swing of a zigzig scanning order on transform coefficients according to an exemplary embodiment of the present invention.

FIG. 3 illustrates a diagram where the current coefficient x is scanned during an upward swing of the zigzag scan, coefficients d, a, x & e being scanned in order, according to an exemplary embodiment of the present invention. FIG. 4 illustrates a diagram where the current coefficient x is scanned during a downward swing of the zigzag scan, coefficients d, a, x & e being scanned in order, according to an exemplary embodiment of the present invention.

Then, the context $Q_N(i,j)$ of the $(i,j)^{th}$ coefficient is defined as a function $f(*)$ of its neighbors:

$$Q_N(i,j) = f(Ra, Rb, Rc) \quad (5)$$

where Ra, Rb and Rc are the reconstructed values of the corresponding coefficients, respectively. Note that the context calculation does not take into consideration the value Rx of the current coefficient x, since this remains unavailable to the decoder. As an example of the function $f(*)$, we employ the following method. We first determine the quantized value of the neighbors $R_i$, i=a, b, c to obtain the vector (Qa, Qb, Qc) as follows:

if $(R_i <= -T3) Q_i = -4$;

else if $(R_i <= -T2) Q_i = -3$;

else if $(R_i <= -T1) Q_i = -2$;

else if $(R_i < 0) Q_i = -1$;

else if $(R_i <= 0) Q_i = 0$;

else if $(R_i < T1) Q_i = 1$;

else if $(R_i < T2) Q_i = 2$;

else if $(R_i < T3) Q_i = 3$;

else $Q_i = 4$; \quad (6)

where i=a, b, c and T1, T2 and T3 are some suitably selected threshold values. If the first non-zero element of the vector (Qa, Qb, Qc) is negative, then all the signs of the vector (Qa, Qb, Qc) shall be reversed to obtain (−Qa, −Qb, −Qc). This reduces the total number of possible values that (Qa, Qb, Qc) can take to 365. Finally, the vector (Qa, Qb, Qc) is mapped on a one-to-one basis into an integer in the range [0 . . . 364] which represents the context $Q_N$ of the transform coefficient under consideration.

(c) Frequency and Nearest Neighbor-based Context Selection

This method of determining the context for each transform coefficient x assumes that the value it takes is dependent both on its spatial frequency (ij) and on the actual values of its reconstructed neighbors a, b and c. Thus, this approach is a combination of the frequency-based and nearest neighbor-based context selection methods. In this method, the scanning mode for the block is the zigzag scan of FIG. 2, and the context value $Q_{FN}(i,j)$ can be determined as follows:

$$Q_{FN}(i,j) = h(N \cdot i + j, Ra, Rb, Rc) \quad (7)$$

where Ra, Rb and Rc are the reconstructed values of its neighbors a, b and c, respectively (as explained with regard to equations (3) and (4) and FIGS. 3 and 4) and $h(*)$ is some function. An example of the function $h(*)$ used is given below:

$$Q_{FN}(i,j) = (N \cdot i + j) \cdot D(|Ra| + |Rb| + |Rc|) \quad (8)$$

where the period denotes multiplication and the function D(x) is given by:

$D(x) = 0$ if $x = 0$ $= 1$ if $x <= T1$ $= 2$ if $x <= T2$ $= 3$ if $x <= T3$ $= 4$ otherwise \quad (9)

and T1, T2 and T3 are some suitably selected threshold values.

Figure 5:
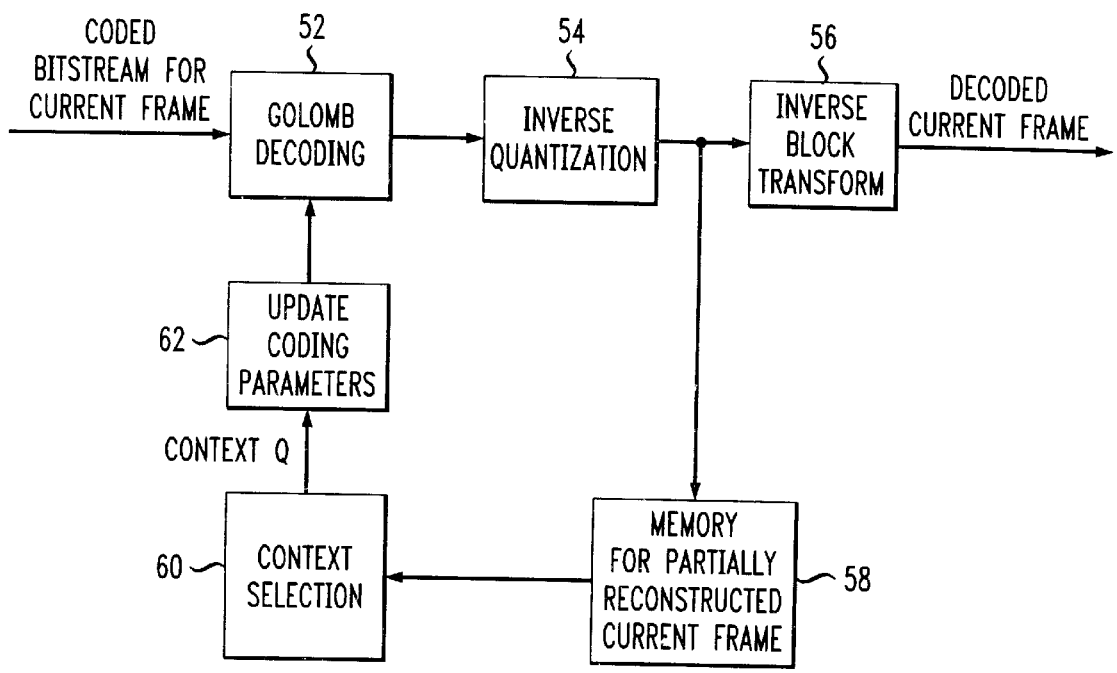
FIG. 5 is a block diagram of an image/video decoder employing context-based block transform decoding according to an exemplary embodiment of the present invention.

Referring now to FIG. 5, a block diagram of an image/video decoder employing context-based block transform coding according to an exemplary embodiment of the present invention is shown. The decoder 50 includes elements similar to those employed and described in conjunction with the encoder 10. Specifically, the decoder 50 includes a Golomb decoder 52, an inverse quantizer 54, an inverse block transformer 56, a memory for partially reconstructed current frame 58, a context selector 60 and an update coding parameters unit 62. Each of these elements have similar functions to the functions of the encoder elements with like names described above.

Accordingly, a coded bitstream for a current frame is received by the decoder 50. The bitstream is decoded in the Golomb decoder (i.e., inverse Golomb coder) 52, yielding the decoded and quantized transform coefficients. Next, the quantized transform coefficients are provided to the inverse quantizer 54 wherein the quantization operation applied at the encoder is reversed. Finally, the reconstructed transform coefficients are provided to the inverse block transformer 56, wherein the inverse of the block transform applied at the encoder, e.g., 8×8 Hadamard transform, is applied to the signal, yielding the decoded current frame or some portion thereof.

The reconstructed transform coefficients at the output of the inverse quantizer 54 are also stored in the memory 58. Similar to the context selector 22 of the encoder 10, the context selector 60 of the decoder 50 uses one or more of the previously reconstructed samples in memory 58 to generate the context value Q. Similar to the coding parameter updater 24 of the encoder 10, the coding parameter updater 62 updates the coding parameters A(Q) and N(Q), which are then used in Golomb decoding of subsequent coefficients that have the same context Q.

Advantageously, in accordance with the invention, knowledge of the previously reconstructed blocks in the current frame is sufficient to determine the context value Q that can be used to decode the current coefficient. Thus, a decoder formed according to the invention does not need to receive coding parameter-related information from an encoder in order to decode a coded bit stream received from the encoder. Therefore, transmission bandwidth and/or storage capacity between an encoder and decoder of the invention is saved.

It is also to be appreciated that the use of Golomb coding in the above embodiments is intended to be merely an example of a compression scheme that takes into account the context of each coefficient. Thus, any compression scheme that takes into account the context of each coefficient may be employed after the context for each coefficient has been selected according to the invention.

It should be noted that the elements of the encoder 10 and decoder 50 may be respectively implemented using a central processing unit, microprocessor, application-specific integrated circuit or other data processing device in a computer, video transmitter, cable system headend, television set-top box or other type of video signal processor. The central processing unit, microprocessor, application-specific integrated circuit or other data processing device may also have memory associated therewith for storing data and results associated with each element's function when necessary. The invention may be utilized in conjunction with numerous types of video processing or transmission systems. Thus, while the invention is illustrated above using an exemplary video encoding system, it should be understood that the invention is not limited to use with any particular type of video signal format, video encoding standard or encoding system configuration. The invention is instead more generally applicable to any video encoding system in which it is desirable to perform block transform coding, while not requiring the transmission of coding parameter-related overhead information to a corresponding decoder.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a block transform-based coding system of processing one or more block transform coefficients associated with at least one block of visual data, the method comprising the steps of:

identifying one or more previously reconstructed block transform coefficients associated with the visual data; and computing a context selection value for use in processing a block transform coefficient associated with the at least one block, the context selection value being based on the one or more previously reconstructed block transform coefficients.

2. The method of claim 1, wherein the method is performed in a video encoder of the system and the processing step includes encoding the block transform coefficient.

3. The method of claim 1, wherein the method is performed in a video decoder of the system and the processing step includes decoding the block transform coefficient.

4. The method of claim 1, wherein the context selection value is computed as a function of one or more values respectively associated with one or more previously reconstructed block transform coefficients in near proximity, with respect to a scanning order, to the block transform coefficient to be processed.

5. The method of claim 4, wherein the one or more previously reconstructed block transform coefficients are a, b and c wherein said coefficients are determined by a first equation: $a=(i+1,j-1)$, $b=(i,j-1)$ and $c=(i-1,j)$ during an upward scan, and by a second equation: $a=(i-1,j+1)$, $b-(i-1,j)$ and $c=(i,j-1)$ during a downward scan.

6. The method of claim 5, wherein the context selection value for the block transform coefficient is represented as $Q_N(i,j)=f(Ra, Rb, Rc)$ where $f(*)$ is a function and Ra, Rb and Rc are the reconstructed values of the corresponding coefficients a, b and c, respectively.

7. The method of claim 1, wherein the context selection value is computed as a function of a spatial frequency associated with the block transform coefficient.

8. The method of claim 7, wherein the block transform coefficient is from an MxN block and has MxN spatial frequencies associated therewith.

9. The method of claim 8, wherein the context selection value for the block transform coefficient is represented as $Q_F(i,j)=N \cdot i+j$, where $i=0,1,\ldots,M-1$ and $j=0,1,\ldots,N-1$.

10. The method of claim 1, wherein the context selection value is used to update parameters used in processing the block transform coefficient.

11. The method of claim 10, wherein the updated parameters are used in a Golomb encoding process.

12. The method of claim 10, wherein the updated parameters are used in a Golomb decoding process.

13. The method of claim 1, wherein the context selection value is computed as: (i) a function of one or more values respectively associated with one or more previously reconstructed block transform coefficients in near proximity, with respect to a scanning order, to the block transform coefficient to be processed; and (ii) a function of a spatial frequency associated with the block transform coefficient.

14. Apparatus for use in a block transform-based coding system for processing one or more block transform coefficients associated with at least one block of visual data, the apparatus comprising:

at least one processing device operative to: (i) identify one or more previously reconstructed block transform coefficients associated with the visual data; and (ii) compute a context selection value for use in processing a block transform coefficient associated with the at least one block, the context selection value being based on the one or more previously reconstructed block transform coefficients.

15. The apparatus of claim 14, wherein the apparatus is included in a video encoder of the system and the processing operation includes encoding the block transform coefficient.

16. The apparatus of claim 14, wherein the apparatus is included in a video decoder of the system and the processing operation includes decoding the block transform coefficient.

17. The apparatus of claim 14, wherein the context selection value is computed as a function of one or more values respectively associated with one or more previously reconstructed block transform coefficients in near proximity, with respect to a scanning order, to the block transform coefficient to be processed.

18. The apparatus of claim 17, wherein the one or more previously reconstructed block transform coefficients are a, b and c wherein said coefficients are determined by a first equation: a=(i+1,j−1), b=(i,j−1) and c=(i−1,j) during an upward scan, and by a second equation: a=(i−1, j+1), b=(i−1,j) and c=(i,j−1) during a downward scan.

19. The apparatus of claim 18, wherein the context selection value for the block transform coefficient is represented as $Q_N(i,j)=f(Ra, Rb, Rc)$ where f(*) is a function and Ra, Rb and Rc are the reconstructed values of the corresponding coefficients a, b and c, respectively.

20. The appartus of claim 14, wherein the context selection value is computed as a function of a spatial frequency associated with the block transform coefficient.

21. The apparatus of claim 20, wherein the block transform coefficient is from an MxN block and has MxN spatial frequencies associated therewith.

22. The apparatus of claim 21, wherein the context selection value for the block transform coefficient is represented as $Q_F(i,j)=N\cdot i+j$, where i=0,1, . . . , M−1 and j=0,1, . . . , N−1.

23. The apparatus of claim 14, wherein the context selection value is used to update parameters used in processing the block-transform coefficient.

24. The apparatus of claim 23, wherein the updated parameters are used in a Golomb encoding process.

25. The apparatus of claim 23, wherein the updated parameters are used in a Golomb decoding process.

26. The apparatus of claim 14, wherein the context selection value is computed as: (i) a function of one or more values respectively associated with one or more previously reconstructed block transform coefficients in near proximity, with respect to a scanning order, to the block transform coefficient to be processed; and (ii) a function of a spatial frequency associated with the block transform coefficient.

27. Apparatus for use in a block transform-based coding system for processing one or more block transform coefficients associated with at least one block of visual data, the apparatus comprising:

a block transform coefficient context selector operative to: (i) identify one or more previously reconstructed block transform coefficients associated with the visual data; and (ii) compute a context selection value for use in processing a block transform coefficient associated with the at least one block, the context selection value being based on the one or more previously reconstructed block transform coefficients.

28. The method of claim 1, wherein the method is respectively performed in a video encoder and a corresponding video decoder of the system such that the video encoder need not provide coding parameter information to the corresponding video decoder.

* * * * *

UNITED STATES PATENT AND TRADEMARK OFFICE
CERTIFICATE OF CORRECTION

PATENT NO. : 6,680,974 B1
DATED : January 20, 2004
INVENTOR(S) : A.F. Faryar et al.

It is certified that error appears in the above-identified patent and that said Letters Patent is hereby corrected as shown below:

Title page,
Item [56], References Cited, OTHER PUBLICATIONS, add the following:

"FCD 14495, Lossless and Near-Lossless Coding of Continuous Tone Still Images," (JPEG-LS), ISO/IEC JTC 1/SC 29/WG 1 FCD 14495 - Public Draft, pp. i-75, July 16, 1997.
X. Wu et al., "Context-Based, Adaptive, Lossless Image Coding," IEEE Transactions on Communications, Vol. 45, No. 4, pp. 437-444, April 1997.
W. Philips et al., "A Lossless Version of the Hadamard Transform," Proceedings of the ProRISC Workshop on Circuits, Systems and Signal Processing, pp. 387-392, 1997.
Z. Xiong et al., "Space-Frequency Quantization for Wavelet Image Coding," IEEE Transactions Image Processing, Vol. 6, pp. 677-693, 1997.
N.D. Memon et al., "Lossless Compression of Video Sequences," IEEE Transactions on Communications, Vol. 44, No. 10, pp. 1340-1345, October 1996.
A. Said et al., "A New, Fast, and Efficient Image Codec Based on Set Partitioning in Hierarchical Trees," IEEE Transactions on Circuits and Systems for Video Technology, Vol. 6, No. 3, pp. 243-250, June 1996.
"Video Coding for Low Bitrate Communication," International Telecommunication Union, Draft H.263, 54 pages, May 2, 1996.
M.J. Weinberger et al., "Applications of Universal Context Modeling to Lossless Compression of Gray-Scale Images," IEEE Transactions on Image Processing, Vol. 5, No. 4, pp. 575-586, April 1996.
H.G. Musmann et al., "Advances in Picture Coding," Proceedings of the IEEE, Vol. 73, No. 4, pp. 523-548, April 1985.

Signed and Sealed this

Sixth Day of April, 2004

JON W. DUDAS
*Acting Director of the United States Patent and Trademark Office*